US008724779B2

(12) United States Patent  
Akolkar et al.

(10) Patent No.: US 8,724,779 B2  
(45) Date of Patent: May 13, 2014

(54) PERSISTING CUSTOMER IDENTITY VALIDATION DURING AGENT-TO-AGENT TRANSFERS IN CALL CENTER TRANSACTIONS

(75) Inventors: Rahul P. Akolkar, Tuckahoe, NY (US); Joao P. Goncalves, Wappingers Falls, NV (US); Jacquelyn A. Martino, Cold Spring, NY (US); Mathew S. Thoennes, West Harrison, NY (US)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 13/424,989

(22) Filed: Mar. 20, 2012

(65) Prior Publication Data

US 2013/0251119 A1 Sep. 26, 2013

(51) Int. Cl.
*H04M 1/64* (2006.01)
*H04M 1/56* (2006.01)

(52) U.S. Cl.
USPC .................................. 379/88.02; 379/142.05

(58) Field of Classification Search
USPC .......................................... 379/88.02, 142.01
See application file for complete search history.

(56) References Cited

U.S. PATENT DOCUMENTS

| 5,623,539 | A | * | 4/1997 | Bassenyemukasa et al. | 379/88.02 |
| 6,101,242 | A | * | 8/2000 | McAllister et al. | 379/88.02 |
| 6,185,536 | B1 | * | 2/2001 | Haber et al. | 704/273 |
| 6,480,599 | B1 | * | 11/2002 | Ainslie et al. | 379/265.02 |
| 6,826,159 | B1 | | 11/2004 | Shaffer et al. | |
| 6,829,332 | B2 | | 12/2004 | Farris et al. | |
| 6,925,154 | B2 | * | 8/2005 | Gao et al. | 379/88.03 |
| 7,003,466 | B2 | * | 2/2006 | Brown et al. | 704/275 |
| 7,035,386 | B1 | * | 4/2006 | Susen et al. | 379/93.02 |
| 7,154,999 | B2 | | 12/2006 | Florkey et al. | |
| 7,305,078 | B2 | | 12/2007 | Kardos | |
| 7,636,425 | B2 | * | 12/2009 | Chambers et al. | 379/88.02 |
| 7,822,605 | B2 | | 10/2010 | Zigel et al. | |
| 2008/0046241 | A1 | | 2/2008 | Osburn et al. | |
| 2008/0300877 | A1 | | 12/2008 | Gilbert et al. | |
| 2010/0119046 | A1 | | 5/2010 | Hoblit et al. | |

OTHER PUBLICATIONS

Mak et al., "A Comparison of Various Adaptation Methods for Speaker Verification With Limited Enrollment Data", ICASSP 2006, pp. 1-929-1-932.
"Session Initiation Protocol", Wikipedia, http://en.wikipedia.org/wiki/Session_Initiation_Protocol, last printed Oct. 11, 2011, pp. 1-10.
"Speaker recognition", Wikipedia, http://en.wikipedia.org/wiki/Speaker_recongnition, last printed Oct. 18, 2011, pp. 1-4.

* cited by examiner

*Primary Examiner* — Joseph T Phan
(74) *Attorney, Agent, or Firm* — Scully, Scott, Murphy & Presser, P.C.; Daniel P. Morris, Esq.

(57) ABSTRACT

A small baseline audio sample is sampled when a person initially calls in and the sample is held only for the duration of the call. For each subsequent transfer, a comparison is made to the baseline established from the initial call and at the end of the call the voice sample is discarded so no resources need to be maintained. Speaker verification and VOIP technologies are used to persist the customer's verification information as service representative hand-offs occur.

23 Claims, 4 Drawing Sheets

PERSISTING CUSTOMER IDENTITY VALIDATION DURING AGENT-TO-AGENT TRANSFERS IN CALL CENTER TRANSACTIONS

BACKGROUND

The present disclosure relates generally to call-centers and customer relationship management (CRM) systems, and more particularly, to a system and method for improving efficiencies in verifying a caller's identification/authentication when transferring calls among call-center agents.

DESCRIPTION OF THE RELATED ART

Call centers provide many types of services. For example, a company may use a call center to service customers around the world and around the clock.

Moreover, call-centers are the main point of contact for much of today's Customer Relationship Management (CRM). For many types of services, such as banking, the customer, when calling in, is required to give some type of identity authentication, e.g. name, address, final four of their social security number. In cases where the customer is transferred to multiple call-center representatives for service, the customer is frequently asked repeatedly for the same verification information. One drawback of the current state of the art is that the customer gets frustrated and feels that the level of customer service is low when their verification information does not persist from representative to representative.

Currently, United States Patent Pub. No.: US 2010/0119046 A1, 2010 describes a system and methods that use voice recognition for substituting or enhancing the caller ID system currently available in telephone communication systems. The basic idea is to have a sample of a caller's voice stored in a database. That sample is retrieved and compared with a second voice sample anytime an identification of the caller is needed. If there is a match between the voice in the second voice sample and the caller's voice in the first voice sample, then the called party is notified of the identity of the calling party.

As described in US 2010/0119046 A1, the second voice sample is either a voice mail message (i.e., the caller leaves a voice message at the called party's voice mail system), or a voice sample accompanying the initial call signal (i.e., the caller initiates the call by a voice activation command and that voice sample is recorded and sent with the call signal).

Despite the above, there remains a need for a method and system to systematically persist the customer's verification information as the call is handed off to and among various service representatives of a call center or like CRM infrastructure.

SUMMARY

A system, method and computer program product addresses the needs described above by using speaker verification and VOIP technologies (voice over internet protocol) to systematically persist the customer's verification information as service representative hand-offs occur.

The system, method and computer program product provides an ability for a call-center CRM system to take a small, baseline audio sample when the caller initially calls in and holds the sample only for the duration of the call. For each subsequent transfer, the baseline sample is compared with speaker utterance for verification at the subsequent call-center stations. At the end of the call, the voice sample is thrown away so no resources need to be maintained.

In one aspect, there is provided a caller verification system for call-in center transactions having at least one call-in service agent. The system comprises: a first communications device associated with a first service agent for receiving a communication from a calling party, and receiving and recording first voice utterances from the calling party; a memory storage device associated with the first communications device for temporarily storing the recorded first voice utterances received by the calling party; a programmed computing device configured to obtain the stored first voice utterances and generate a first voice model representing the calling party's voice for temporary storage at the memory storage device; a communications network providing a path for transferring the communication and the generated first voice model from the first communications device to a second communications device associated with a second service agent, the second communications device receiving and recording second voice utterances in real-time from the calling party, and temporarily storing the recorded second voice utterances received by the calling party in the memory storage device; the programmed computing device configured to obtain the stored second voice utterances, and generate a second voice model representing the calling party's voice for temporary storage at the memory storage device; the programmed computing device further comparing the second voice model against the stored first voice model and providing to the second service agent an indication of a degree of match while the caller remains on the call, wherein the call is continued without further caller validation of the calling party by the second agent if a match is indicated, or if a match is not indicated, the second service agent providing further caller validation of the calling party before continuing with the call.

In a further embodiment, there is provided a method of caller verification for call-in center transactions having at least one call-in service agent. The method comprises: receiving, at a first communications device associated with a first service agent, a communication from a calling party, and receiving first voice utterances from the calling party; recording, for temporary storage at a memory storage device associated with the first communications device, the first voice utterances received by the calling party; generating, from the stored first voice utterances, a first voice model representing the calling party's voice for temporary storage at the memory storage device; transferring, over a communications network, the call and the generated first voice model from the first communications device to a second communications device associated with a second service agent, and temporarily recording for storage at the memory storage device second voice utterances received in real-time from the calling party at the second communications device; generating, from received second voice utterances from the calling party, a second voice model representing the calling party's voice for temporary storage at the memory storage device; comparing the second voice model against the stored first voice model and providing to the second service agent an indication of a degree of match while the caller is on the call, and, one of: continuing the call without further caller validation if a match is indicated, or the second service agent invoking further caller validation of the calling party before continuing with the call if a match is not indicated, wherein a programmed processor device is configured to perform one or more the generating first and second voice models and the comparing In a further aspect, a computer program product is provided for performing operations. The computer program product includes a storage medium readable by a processing circuit and storing instructions run by the processing circuit for running a method. The method is the same as listed above.

BRIEF DESCRIPTION OF THE DRAWINGS

The objects, features and advantages of the invention are understood within the context of the Detailed Description, as set forth below. The Detailed Description is understood within the context of the accompanying drawings, which form a material part of this disclosure, wherein.

DETAILED DESCRIPTION

One embodiment provides a system, method and computer program product for automatically obtaining a small baseline audio sample when a person initially calls in to a phone call-center and holding the sample only for the duration of the call. For each subsequent transfer of that call, a comparison is made to the baseline audio sample established from the initial call, and at the end of the call the voice sample is discarded so no resources need to be maintained. Speaker verification and VOIP technologies are used to persist the customer's verification information as service representative's call hand-offs occur.

Figure 1:
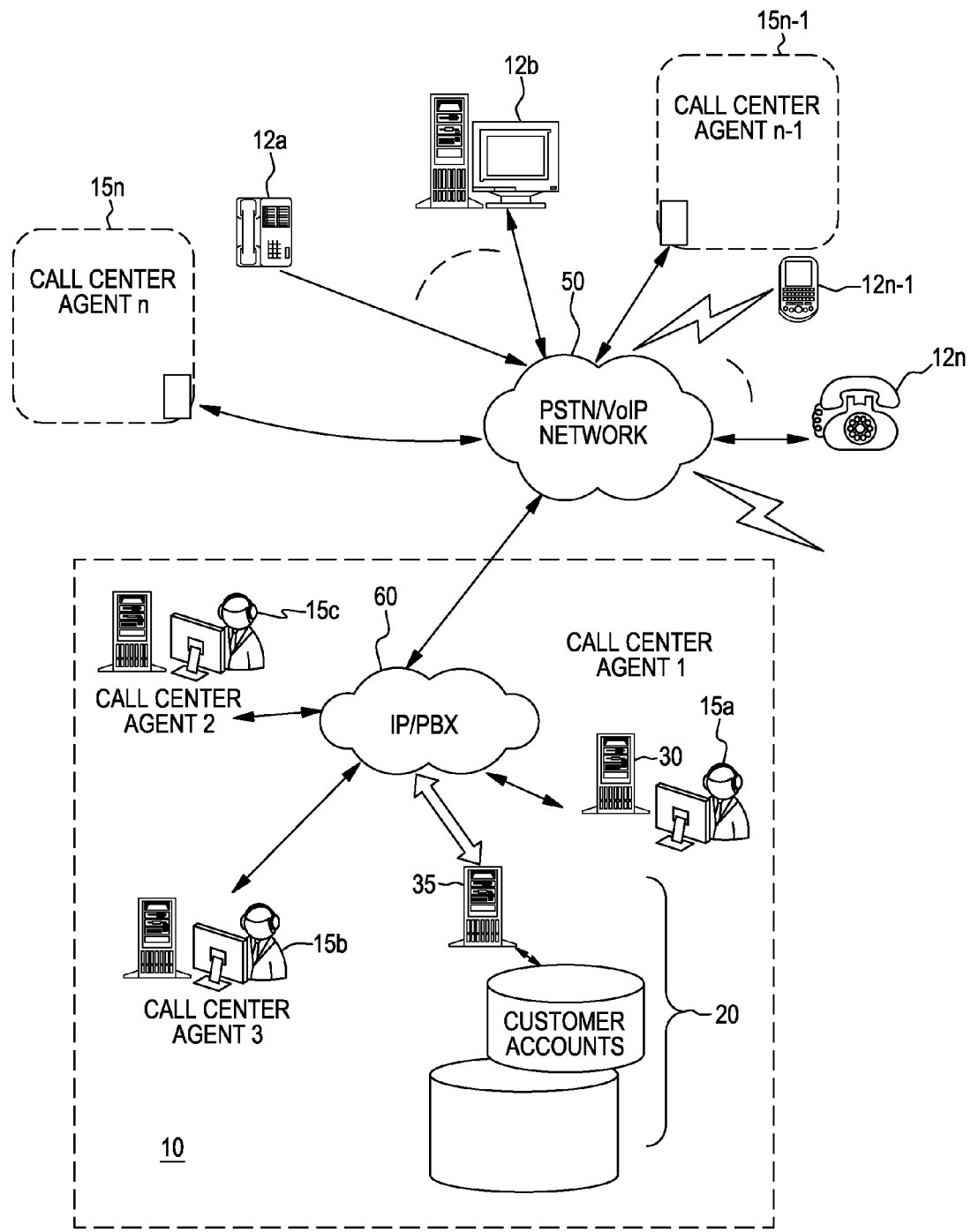
FIG. 1 depicts a general diagram of a call-in service center 10 implementing verification and VOIP technologies providing persistent customer's verification information for agent to agent call hand-offs.

FIG. 1 depicts a general diagram of a call in service center 10 implementing verification and VOIP technologies to persist the customer's verification information as a service representative's call is handed-off to other agents.

The call-in service center 10 implements call-center communications device hardware and software functionality configured to receive customer calls for various reasons, e.g., order placement, order troubleshooting, billing inquiries, complaints, or any other purpose the call in service center 10 is set up to address. As part of call-center functionality, a call agent 15a, 15b, etc., receives incoming calls through his or her telephony or SIP (Session Initiation Protocol) phone device 30 and initiates a call dialog with the caller such as a caller represented by devices 12a, ... 12n. In an alternate embodiment, a caller may be automatically voice prompted to initiate dialog with a caller. Callers can communicate via a variety of remote user communications devices 12a, ... 12n, including traditional telephony devices, mobile phones, VoIP capable terminals, or any communications device which can access the call-in center via known communication technologies.

In the embodiment of FIG. 1, the calling center 10 operatively communicates with an existing public switched (e.g., circuit-switching) telecommunications network, i.e., to receive calls from customer via a PSTN, and communicates/transfers calls over the Internet, e.g., a VoIP network 50. A customer contacts a call center 10 initiated via the customer's wired or wireless communications device 12a, ..., 12n, whether though a landline connection, cellular, PCS, SIP phone or other type of connection. In one embodiment, the call is routed from the public switched network or VoIP network 50 to a private call switching network 60 employing a centralized switch, e.g., a private broadcast exchange (PBX), ACD or Softswitch, or may include an intranet. In a non-limiting embodiment shown in FIG. 2, while a plurality of call-in center agents 15a, 15b may be in a centralized call-in service center at a single geographic location or site, other call-in service center agents $15_{n-1}$, $15_n$ may be in remote located service center sites at distributed geographic locations. Thus, in the course of operation, it may be the case that calls initiated from callers may be handed off, i.e., transferred, to other agents or personal either at the same location, via local or private switching network 60, e.g., employing a PBX, for example, or transferred over the VoIP network to other agents $15_{n-1}$, $15_n$ or personnel at distributed call center locations.

Figure 2:
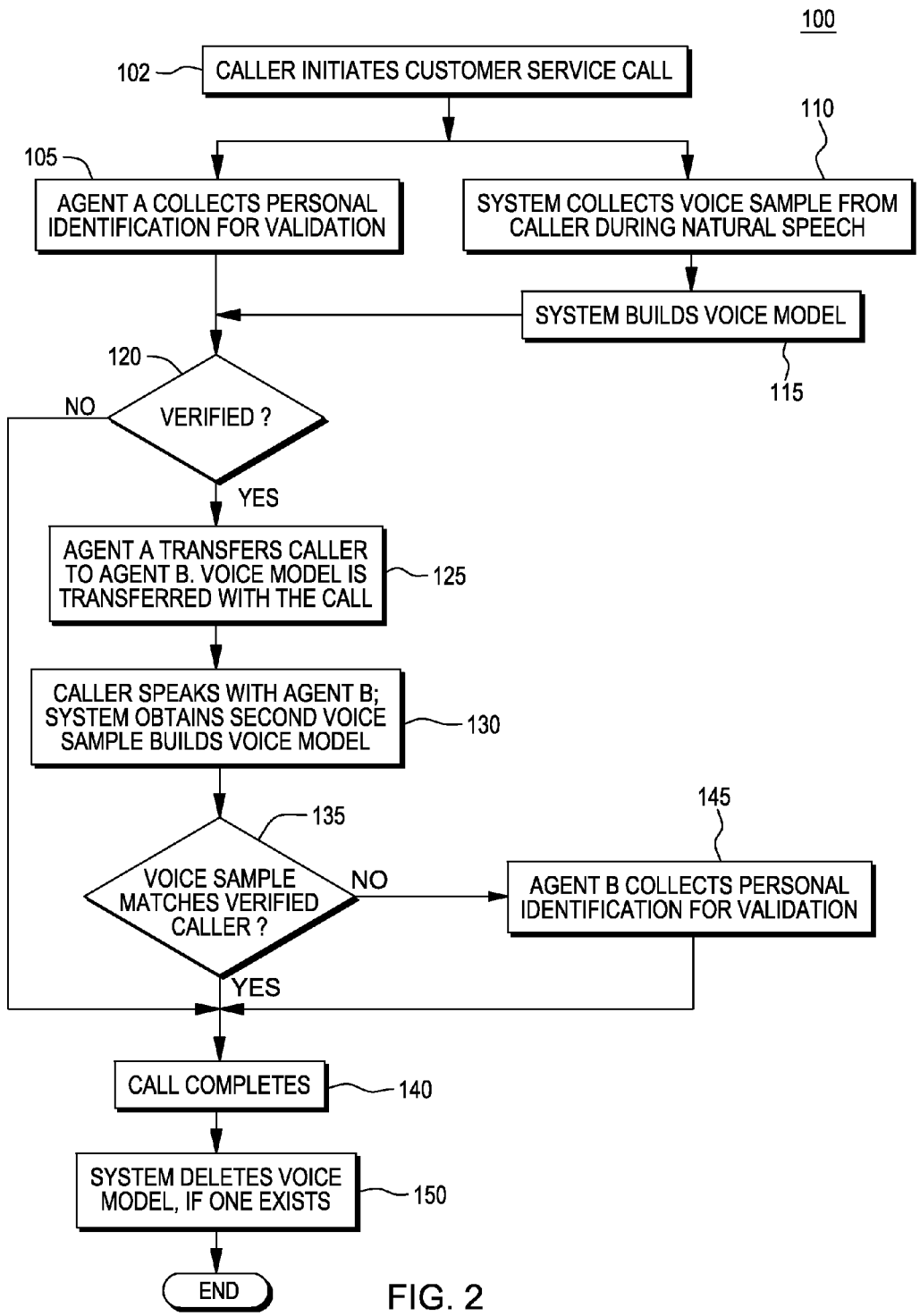
FIG. 2 depicts a method 100 implementing functionality obtaining a small baseline audio voice sample when a caller initially calls in to the call-center and using that same voice sample for customer verification as calls are handed off to other agents.

FIG. 2 depicts a method 100 implementing functionality obtaining a small baseline audio voice sample when a caller (customer or user) initially calls in to the call-center 10 at 102 and using that same voice sample for customer verification as calls are handed off from a first agent to another agent(s). As part of the method 100 of FIG. 2, at 105, a call agent (call Agent "A") receiving a call from a caller for any of the above-described purposes, can enter and view caller identification information from computer terminal 30 to validate the caller, e.g., as a customer. In one aspect, at 110, the call-in center agent, via spoken dialogue with the caller, may exact information from the caller, e.g., information regarding the location, age, and gender of the user, and/or any other information typically used by call agents to collect a caller's personal identification for validation or updating customer databases. Additionally, this information may be viewed by the calling center agent, via that agent's terminal display device. Thus, in one aspect, the call center functionality requires the caller to be initially identified by answering questions that the called party (e.g., call-in service center agent) asks, or when answering questions in response to voice prompts. Concurrently, at 115, the system collects in real-time a voice sample (e.g., natural speech) from the caller. That is, a first voice sample is obtained by recording the caller's voice when he/she starts to speak in the normal discourse.

In one embodiment, either before or while a conversation with the caller is initiated, a voice recorder device built in to the service agent's workstation or a local to the system back-end infrastructure and associated agent's terminal is invoked to digitize (sample) in real-time the caller's voice speech (utterances). The voice recorder may be invoked automatically upon receipt of the call, or invoked by the calling agent, and records several seconds of the caller's voice in the course of discourse with the service agent, e.g., when the caller responds to questions, or responds to voice prompts, etc., which happen within the initial seconds of the call. In one embodiment, about 3 or 4 seconds or more worth of a caller's voice is sufficient to get a voice finger print, e.g., a voice model. The call center functionality implemented in the system immediately stores the voice sample, e.g., in the communications infrastructure. For example, the sampled caller's voice may be stored in a memory storage device local to the calling agent's workstation or device 30 or, in a back-end network storage structure such as a IP/PBX proxy server device 35. Subsequently, while still conversing with a caller, the call center functionality implemented in the system immediately accesses the stored voice sample and generates a corresponding unique voice model at 115 that is associated with the caller of the currently active call. For example, a voice model may represent the caller's voice fingerprint including attributes that reflect, for example, caller's vocal tract shape, short-term spectral features, pitch contours, linguistic units, stylistic aspects of speech etc. as appropriate. The disclosure does not require the use of any particular attributes.

In one embodiment, several techniques that may be implemented for generating a voice model from the received caller's voice utterances are described in a reference to Mak et al. entitled A COMPARISON OF VARIOUS ADAPTATION METHODS FOR SPEAKER VERIFICATION WITH LIMITED ENROLLMENT DATA, I.E.E.E. International Conference on Acoustics Speech and Signal Processing (ICASSP) (2006), the whole content and disclosure of which is incorporated by reference as if fully set forth herein. Such techniques include, but are not limited to: 1. kernel eigenspaced-based MLLR (KEMLLR), maximum a posteriori (MAP), maximum-likelihood linear regression (MLLR), and reference speaker weighting (RSW) techniques. Functions performing voice model build from limited enrollment data (e.g., voice utterances) according to such techniques may be operated by computing device or workstation 30 associated with the caller agent device, or, at the back-end infrastructure, e.g., at server device 35, FIG. 1. Further details regarding front end processing for feature extraction and speaker modeling, that can be implemented at the calling center call agent's workstation is found in http://www.11.mitedu/mission/communications/publications/publication-files/full_papers/020314_Reynolds.pdf, incorporated by reference as if fully set forth herein.

Returning to FIG. 2, upon verifying the caller at 120 and building voice model, during processing of the current call, the call is transferred to another call-center service agent. In one embodiment, the caller's voice model is seamlessly transferred with the call from the call center agent A to a second call center agent B at 125, FIG. 2 while the caller remains on the line. For example, the call is transferred via functionality operating in the private networked (e.g., PBX-based) and/or public (e.g., VoIP-based) communications network infrastructure. If transfer happens, and if both back-end systems are the same, i.e., no VoIP needed, the voice sample signals or voice model does not have to travel and can remain in a temporary memory storage location or buffer. This would happen for example as shown in FIG. 1 where call center agent 1 (Agent A) 15*a* routes a call via a private call switching network (PBX) 60 to another Agent B, e.g., agent 15*b*, or agent 15*c*, that share the same back-end infrastructure. In this aspect, the call voice sample and generated voice model may be temporarily buffered in an associated memory storage device, e.g., at the call center agent's phone device. Alternately, call center Agent A 15*a* routes the call and the obtained voice model via public call switching network or VoIP network 50 to another remote call-center agent, e.g., Agent B 15*n*, that do not share a back-end infrastructure. In this scenario, the generated first voice model is temporarily stored at the terminal or back-end infrastructure of the remotely-located second calling agent.

In one embodiment, irrespective of the underlying communications protocol implemented for transferring receiving calling center calls, the generated caller's voice model is associated with the data structures that is associated with the call and is added to structures in place for handling and storing the information about a specific active call. For example, the VoIP communications for voice and multi-media may implement one of the following network protocols: H.323, Media Gateway Control Protocol (MGCP), Session Initiation Protocol (SIP), Real-time Transport Protocol (RTP), Session Description Protocol (SDP), Inter-Asterisk eXchange (IAX).

Figure 3:
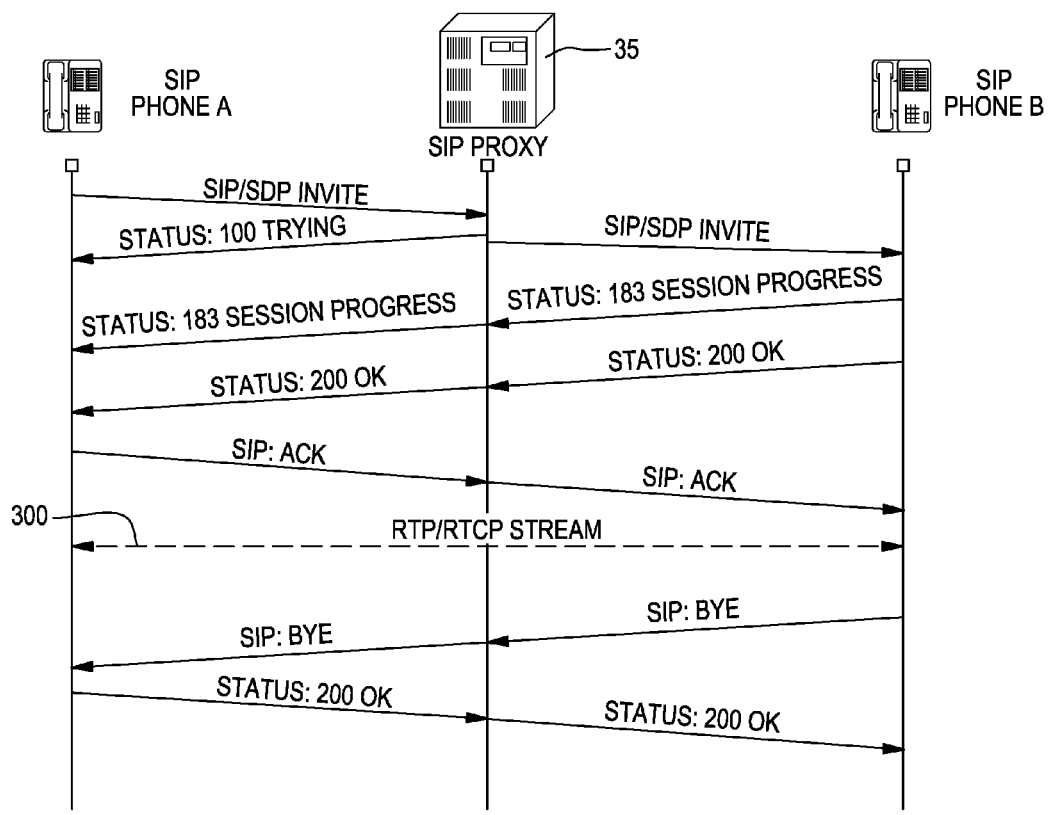
FIG. 3 depicts a signaling diagram 200 of SIP (Session-Initiation-Protocol) based communications responsible for establishment of the call connections, and voice model data transfer in one embodiment; and, FIG. 4 illustrates an exemplary hardware configuration of a computing system 400 operable in the communications infrastructure that can run the method steps depicted in FIG. 2.

FIG. 3 depicts a signaling diagram 200 of an example SIP (Session-Initiation-Protocol) based communications responsible for establishment of the call connections and terminations between the two end-points of the call including transfers of the call from a first Agent A to a second Agent B. Using SIP protocol, an additional data stream established between the service station end-points such as described in http://en.wikipedia.org/wiki/Session_Initiation_Protocol, the whole contents and disclosure of which is incorporated by reference as if fully set forth herein. Via a SIP terminal, the model of the caller's voice sample may be passed within a VOIP system.

As shown in FIG. 3, the SIP server or proxy server 35 of FIG. 1 provides server functions such as: proxy service for receiving connection requests from the clients and transferring calls to other stations), reconnection and responsible for client database maintenance, connection establishing, maintenance and termination, and call directing. As shown in FIG. 3, basic signaling messages sent in the SIP environment include INVITE—connection establishing request, ACK—acknowledgement of INVITE by the final message receiver, BYE—connection termination.

It is understood that other IP protocols may then be implemented to move the data (such as voice) associated with the on-going call. For voice, the standard protocol used to transport the voice in VoIP is Real-Time Transport Protocol (RTP). For example, as shown in FIG. 3, a Real-Time Transport Protocol (RTP) stream 300 implemented for transporting voice in VoIP in the middle of the SIP protocol exchange remains intact for the duration of the call; although the voice model does not have time constraints, this RTP transfer protocol could also be used to transport the voice model. Otherwise, any reliable IP data transport protocol could be used to communicate the initial voice model of the caller.

One embodiment includes extending the data structure describing the call which is maintained by the SIP environment to include the voice model. The voice model would originally be on the end-device (phone) of the original recipient of the call (the first service agent) and then transferred to the end-device (phone) of the second service agent that the call is transferred to.

In either embodiment, at 130, FIG. 2, after the call is routed to Agent B, a further voice sample is obtained from the same caller. For example, the caller's spoken word may be obtained as initiated by the second agent B seamlessly asking the caller: "How can I help you today?", for example, or any other query or phrase that the second agent (e.g., Agent B) would normally speak to engage the caller. Alternately, the caller may be auto prompted to respond with vocal answers. Then, using the same aforesaid techniques implemented for generating a voice model from the received caller's voice utterances, a second voice model is constructed from the second voice sample obtained when the caller talks with the second agent (agent B). That is, in the similar manner as described with respect to processing at Agent A, while the caller speaks to Agent B, the system collects a voice sample from the caller and then builds a second voice model from that sample which may be temporarily locally stored. As in obtaining the first caller's voice sample, only a couple seconds of utterance is sufficient for corresponding voice model comparison purposes. It is understood that in a completely automated call center operation, the caller may be automatically prompted to speak or enter a voice sample for which a model can be created. In a further embodiment, a programmed computing device may be configured to process stored caller first and second voice utterances to generate a respective first voice model and second voice model using a small biometric sample for enrollment verification; the biometric sample including a few seconds worth of speech utterance.

Continuing at 135, FIG. 2, after the second voice model is constructed, the system back-end infrastructure interfacing calling center second agent B, implements functionality for comparing the second voice model with the first voice model transferred with the call and determine if there is a match, i.e., whether the two models come from the speech of the same person. In one embodiment, the degree of match is associated with a confidence level. In one embodiment, as discussed in Mak et al. (ICASSP 2006) techniques like kernel eigenspace-based MLLR (KEMLLR) allow for small enrollment verification using utterances from as much as less than or equal to 4 seconds of obtained speech (voice utterance). KEMLLR is one applicable technique that may be used to obtain the voice model for use in performing the speech comparison. Otherwise, any device capable of performing KEMLLR, such as a computer with the appropriate speech analysis software to process the obtained speech could be used.

After obtaining a comparison result, the system generates for presentation via a display device associated with and the second called agent's call processing workstation, an indication as to confidence with which system can ascertain if current call is the same as caller in the received voice model. In one embodiment, this occurs as soon after the caller speaks to the called second agent after the transfer to the second agent's device. For example, while the caller explains to the second agent why he/she is calling the system, the system determines from first and second voice model comparison results of if there is a match. Depending upon the matching result, in one embodiment, the second service agent's display device may be provided with a green or red flashing light, or a pop-up display of a confidence threshold number, for example, or any other like indicator indicating either the need to obtain again personalized identification information from the caller or not. At that point, if the indicator presents a match indication, agent B forgoes having to obtain personalized identification information and will proceed helping the caller until call completion at 140, FIG. 2. If the indicator does not indicate a match, then the agent will take additional steps as in a normal course of processing calls to obtain the caller's identity for validation at 145, FIG. 2, before proceeding to handling and/or call completion. For example, the second calling agent may say: "In order to help you I must first ask you a few questions to verify your identity". Alternately, or in combination, if a mismatch or no confidence comparison result is indication, then the caller may be automatically prompted to re-enter identification information and/or other relevant information as required by the transfer.

Finally, after the call completed, there is triggered at 150, FIG. 2, the deletion of the temporarily stored voice model in response to the termination of the active call.

For the example SIP environment in the embodiment depicted in FIG. 3, the data management of the voice model is associated with the specific (active) call, and when the call is terminated or transferred the recorded voice sample and corresponding generated voice model data would be deleted as part of the clean-up of the call. For the first agent this would occur once the call has been successfully transferred to the second agent; and for the second agent call clean-up occurs when the call is terminated.

It should be understood that there is no limit to the number of transfers in which the caller and the caller's voice model data is transferred via multiple hand-offs to service representatives. That is, the processing of steps 125-140 may be repeated for each call-in service agent to agent transfer to automatically identify and verify that the same caller remains on the line when a call is transferred to the other agents without the need to ask again for a caller's identity verification information and with little resource overhead.

Thus, via methodology of FIG. 2, a method of caller validation with no persistence is achieved as the obtained caller voice sample is held only for the duration of the call. In this aspect, a voice model created in real-time is temporarily maintained (stored) in the VOIP infrastructure to automatically identify and verify that a same caller remains on the line when a call is transferred to other agents without the need to ask again for a caller's identity verification information and without having to pre-record a user's voice sample and keep it in a database.

Figure 4:
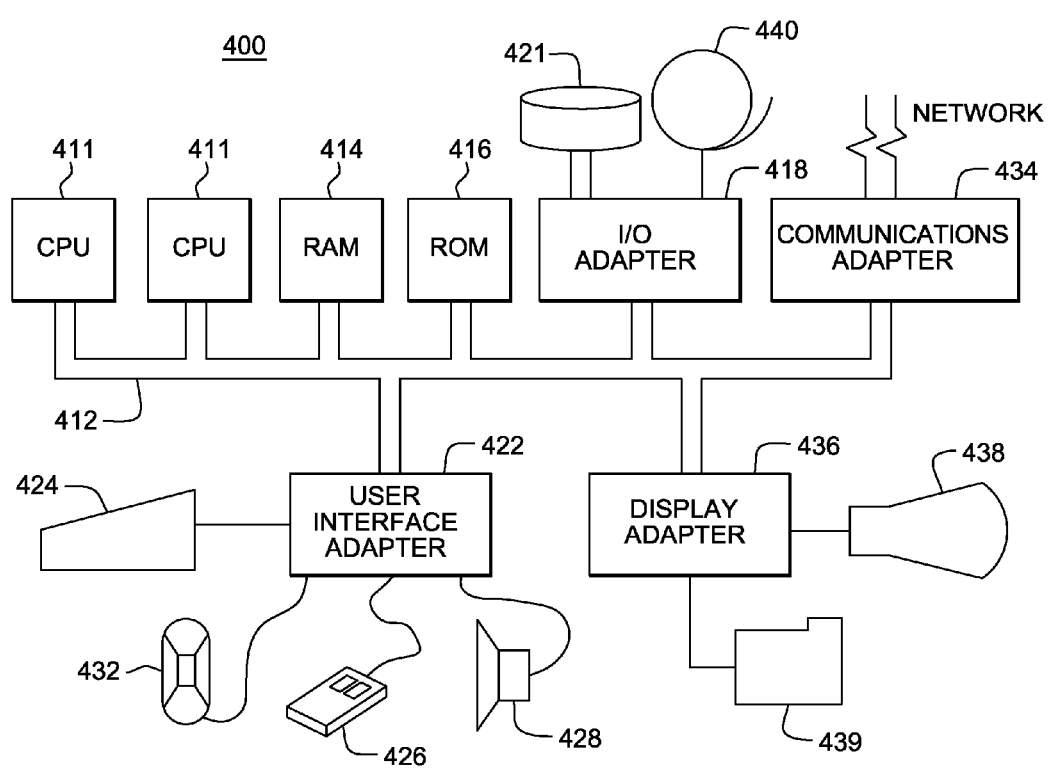

FIG. 4 illustrates an exemplary hardware configuration of a computing system 400 present in the communications infrastructure that can run the method steps depicted in FIG. 2. In one aspect, computing system 400 provides the system processing of the calling agent's workstation 30 or SIP server 35 of FIG. 1, for example. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, disk drive device 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more tangible computer readable medium(s) having computer readable program code embodied thereon.

Any combination of one or more computer readable medium(s) may be utilized. The tangible computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A system for verifying callers of telephone call-in centers, said call-in centers having at least one call-in service agent, said system comprising:

a first communications device associated with a first service agent for receiving a communication from a calling party, and receiving and recording first voice utterances from said calling party;

a memory storage device associated with said first communications device for temporarily storing said recorded first voice utterances received by said calling party;

a programmed computing device configured to obtain said stored first voice utterances and generate a first voice model representing the calling party's voice for temporary storage at said memory storage device;

a communications network providing a path for transferring said communication and said generated first voice model from said first communications device to a second communications device associated with a second service agent, wherein after said transferring, said second communications device receiving and recording second voice utterances in real-time from said calling party, and temporarily storing said recorded second voice utterances received by said calling party in said memory storage device;

a further programmed computing device associated with said second service agent configured to generate a second voice model representing the calling party's voice for temporary storage at said memory storage device;

said programmed computing device further comparing said second voice model against said stored first voice model and providing to said second service agent an indication of a degree of match while said caller remains on the call, said call being continued without further caller validation of said calling party by said second agent if a match is indicated, or if a match is not indicated, said second service agent providing further caller validation of said calling party before continuing with said call, and said programmed computing device configured to delete the recorded first and second voice utterances of said calling party, and deleting the corresponding generated first and second voice models after said call transferring or call completion.

2. The system as claimed in claim 1, wherein said communications network includes a public switched telecommunications network to transfer said call from said first agent to said second agent.

3. The system as claimed in claim 2, wherein said communications network includes a private switching network.

4. The system as claimed in claim 1, wherein said programmed computing device configured to generate said first and second voice models representing the calling party includes a first processor device associated with said communications device of said first service agent and a second processor device associated with said communications device of said second service agent.

5. The system as claimed in claim 1, wherein said memory storage device includes: a first memory storage device associated with said first communications device of said first service agent, and a second memory storage device associated with said second communications device of said second service agent.

6. The system as claimed in claim 1, wherein said communications network includes: an intranet or the Internet, wherein said call is transferred from said first agent's communications device to said second agent's communications device according to a voice over Internet Protocol (VoIP) communications protocol.

7. The system as claimed in claim 6, wherein a call transfer and first voice model transfer between said first and second call service agents is established according to a Session Initiated Protocol (SIP) signaling protocol.

8. The system as claimed in claim 1, wherein said programmed computing device is configured to process said caller's first and second voice utterances to generate a respective first voice model and second voice model using a caller's biometric sample for enrollment verification.

9. The system as claimed in claim 1, wherein said programmed computing device is configured to process said stored caller first and second voice utterances to generate a respective first voice model and second voice model according to one of: a maximum-likelihood linear regression (MLLR) technique or kernel eigenspace-based MLLR (KEMLLR) technique.

10. A method of verifying callers of telephone call-in centers, said call-in centers having at least one call-in service agent, said method comprising:
receiving, at a first communications device associated with a first service agent, a communication from a calling party, and receiving first voice utterances from said calling party;
recording, for temporary storage at a memory storage device associated with said first communications device, said first voice utterances received by said calling party;
generating, from said stored first voice utterances, a first voice model representing the calling party's voice for temporary storage at said memory storage device;
transferring, over a communications network, said call and said generated first voice model from said first communications device to a second communications device associated with a second service agent, and temporarily recording for storage at said memory storage device second voice utterances received in real-time from said calling party at said second communications device;
generating, from received second voice utterances from said calling party, a second voice model representing the calling party's voice for temporary storage at said memory storage device;
comparing said second voice model against said stored first voice model and providing to said second service agent an indication of a degree of match while said caller is on the call, and, one of: continuing the call without further caller validation if a match is indicated, or said second service agent invoking further caller validation of said calling party before continuing with said call if a match is not indicated, and
deleting the recorded first and second voice utterances of said calling party, and deleting the corresponding generated first and second voice models after said call transferring or call completion,
wherein a programmed processor device is configured to perform one or more said generating first and second voice models and said comparing.

11. The method as claimed in claim 10, wherein said communications network includes a public switched telecommunications network to transfer said call from said first agent to said second agent.

12. The method as claimed in claim 11, wherein said communications network includes a private switching network.

13. The method as claimed in claim 12, further comprising: generating, via a first processor device associated with said communications device of said first service agent, said first voice model representing the calling party, and generating, via a second processor device associated with said communications device of said second service agent, said second voice model representing the calling party.

14. The method as claimed in claim 10, wherein said memory storage device includes: a first memory storage device associated with said first communications device of said first service agent, and a second memory storage device associated with said second communications device of said second service agent.

15. The method as claimed in claim 10, wherein said communications network includes: an intranet or the Internet, wherein said call is transferred from said first agent's communications device to said second agent's communications device according to a voice over Internet Protocol (VoIP) communications protocol.

16. The method as claimed in claim 15, wherein said transferring of said call and said first voice model between said first and second call service agents is performed according to a Session Initiated Protocol (SIP) signaling protocol.

17. The method as claimed in claim 10, further comprising: processing said caller first and second voice utterances to generate a respective first voice model and second voice model using a small biometric sample for enrollment verification.

18. The method as claimed in claim 10, wherein said programmed processor device is configured to sample said stored caller first and second voice utterances to generate a respective first voice model and second voice model according to one of: a maximum-likelihood linear regression (MLLR) technique or kernel eigenspace-based MLLR (KEMLLR) technique.

19. A computer program product for verifying callers of telephone call-in centers, said call-in centers having at least one call-in service agent, the computer program product comprising:
a storage medium, said storage medium is not only a propagating signal, said storage medium readable by a processing circuit and storing instructions for execution by the processing circuit for performing a method comprising:

receiving, at a first communications device associated with a first service agent, a communication from a calling party, and receiving first voice utterances from said calling party;

recording, for temporary storage at a memory storage device associated with said first communications device, said first voice utterances received by said calling party;

generating, from said stored first voice utterances, a first voice model representing the calling party's voice for temporary storage at said memory storage device;

transferring, over a communications network, said call and said generated first voice model from said first communications device to a second communications device associated with a second service agent, and temporarily recording for storage at said memory storage device second voice utterances received from said calling party at said second communications device;

generating, from received second voice utterances from said calling party, a second voice model representing the calling party's voice for temporary storage at said memory storage device;

comparing said second voice model against said stored first voice model and providing to said second service agent an indication of a degree of match while said caller is on the call, and, one of: continuing the call without further caller validation if a match is indicated, or said second service agent invoking further caller validation of said calling party before continuing with said call if a match is not indicated, and deleting the recorded first and second voice utterances of said calling party, and deleting the corresponding generated first and second voice models after said call transferring or call completion.

20. The computer program product as claimed in claim 19, wherein said communications network includes the Internet, said call transferring between said first and second call service agents is established according to a Session Initiated Protocol (SIP) signaling protocol.

21. The computer program product as claimed in claim 19, wherein said programmed processing circuit is configured to obtain said stored caller first and second voice utterances to generate a respective first voice model and second voice model according to one of: a maximum-likelihood linear regression (MLLR) technique or kernel eigenspace-based MLLR (KEMLLR) technique.

22. The computer program product as claimed in claim 19, wherein said programmed processing circuit is configured to process said caller's first and second voice utterances to generate a respective first voice model and second voice model using a caller's biometric sample for enrollment verification.

23. The computer program product as claimed in claim 19, wherein said memory storage device includes: a first memory storage device associated with said first communications device of said first service agent, and a second memory storage device associated with said second communications device of said second service agent.

* * * * *